United States Patent [19]

Masuhara et al.

[11] Patent Number: 5,432,208
[45] Date of Patent: Jul. 11, 1995

[54] PHOTOCURING ADHESIVE CONTAINING AN OLIGO SILOXANYL DI(METH)ACRYLATE

[75] Inventors: Eiichi Masuhara, Tokyo; Shigeo Komiya, Urawa; Takeyuki Sawamoto, Tokyo; Yumiko Satou, Hino, all of Japan

[73] Assignee: Japan Institute of Advanced Dentistry, Tokyo, Japan

[21] Appl. No.: 137,082

[22] PCT Filed: Feb. 25, 1992

[86] PCT. No.: PCT/JP92/00203

§ 371 Date: Dec. 14, 1993

§ 102(e) Date: Dec. 14, 1993

[87] PCT Pub. No.: WO93/17078

PCT Pub. Date: Sept. 2, 1993

[51] Int. Cl.$^6$ .................. C09J 4/02; C09J 183/07; C09J 133/08; C09J 133/10
[52] U.S. Cl. .................. 522/99; 522/172; 528/25
[58] Field of Search .......... 522/99, 182, 172; 528/32, 25

[56] References Cited

U.S. PATENT DOCUMENTS

| | | | |
|---|---|---|---|
| 4,136,250 | 1/1979 | Mueller et al. | 528/25 |
| 4,943,613 | 7/1990 | Arai et al. | 528/99 |
| 5,007,975 | 4/1991 | Yamamoto et al. | 522/182 |
| 5,104,591 | 4/1992 | Masuhara et al. | 264/16 |

FOREIGN PATENT DOCUMENTS

| | | |
|---|---|---|
| 173174 | 10/1983 | Japan . |
| 181835 | 8/1986 | Japan . |
| 1060618 | 3/1989 | Japan . |
| 1304108 | 12/1989 | Japan . |

*Primary Examiner*—Susan W. Berman
*Attorney, Agent, or Firm*—Nixon & Vanderhye

[57] ABSTRACT

This invention relates to a photocuring adhesive characterized in that a photoinitiator is added to a monomer composition comprising 20 to 50 wt % of the oligosiloxanyl di(meth)acrylate represented by the structural formula (1) shown below, 20 to 60 wt % of a hydrophobic mono (meth)acrylate having a hydrocarbon group containing no less than six carbon atoms in a side chain, and 1 to 80% of a hydrophilic monomer capable of undergoing free radical polymerization:

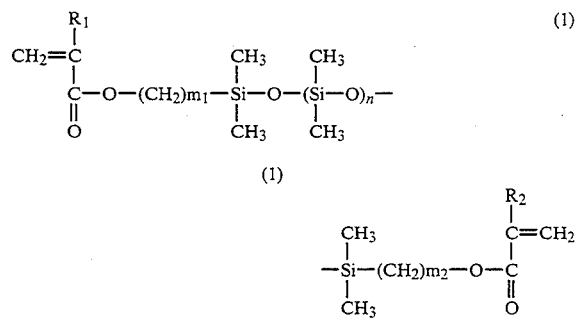

$R_1$ and $R_2$ both being either hydrogen or methyl, $m_1$ and $m_2$ being an integer in the range 2 to 5, and n being an integer in the range 5 to 30.

3 Claims, No Drawings

PHOTOCURING ADHESIVE CONTAINING AN OLIGO SILOXANYL DI(METH)ACRYLATE

TECHNICAL FIELD OF APPLICATION

This invention relates to a photocuring adhesive which hardens and exhibits excellent bonding strength when irradiated by energy such as ultraviolet light or visible light, and more specifically to a photocuring adhesive having excellent water resistance, humidity resistance, low temperature resistance and heat shock resistance when used as an adhesive for glass or ceramics.

BACKGROUND ART

Conventionally, photocuring adhesives consisted of a monomer composition prepared by mixing a low viscosity monomer generally referred to as a reactive diluent, such as trimethylolpropane tri(meth)acrylate or hydroxyethyl (meth)acrylate, with an oligomer such as urethane (meth)acrylate. The latter was obtained by reacting an epoxy(meth)acrylate having (meth)acryloxy groups at both ends of a bis-phenol A skeleton or a compound having no less than two isocyanate groups such as isophorone diisocyanate with 2-hydroxyethyl (meth)acrylate or the like. A small quantity of a photopolymerization initiator was then added.

Compared to the solvent dilution adhesives or thermocuring adhesives which were previously used, these photocuring adhesives are now much more common as they have the following advantages.

Firstly, photocuring adhesives basically do not contain any solvent which has an effect on adhesive properties. Compared to solvent vaporizing adhesives, therefore, they present practically none of the risk associated with handling the adhesive (that occurs when large quantities of solvent evaporate) or adhesion breakdown due to the marked volume contraction. Moreover, photocuring adhesives develop practically useful adhesive properties when irradiated for a few seconds or minutes. Compared to conventional thermocuring adhesives which required heating for a period ranging from several hours to several tens of hours, therefore, they speed up the adhesive process and permit large savings of the energy previously used for heating, while at the same time there is practically no damage to the substrate, such as thermal aging.

Due to these advantages, photocuring adhesives find application in, for example, fixing cover glasses to the display plates of wristwatches, or assembling liquid crystal display panels. Recently, they have begun to be used also for the bonding or assembly of optical devices in optronics such as optical disks, optical communications and optical circuits.

However, conventional photocuring adhesives have a disadvantage in that they generally have poor resistance to water or humidity after adhesion. Also, in very cold environments such as at temperatures of −20° C. or below or when there is a sudden temperature change, these photocuring adhesives easily peel off.

Precision-machined products such as for example wristwatches or liquid crystal display devices bonded with these adhesives had insufficient durability, while in the optronics field the reliability of devices assembled by bonding could not be improved. A solution to these problems was therefore earnestly desired.

Attempts were made to improve low temperature properties by using silicon rubbers which cure at room temperature (RTV rubbers), or photocuring adhesives which comprise silicon oligomers having free radical reactivity.

In the case of RTV rubbers, however, not only is it difficult to achieve curing in a short time period, but pot life is also short. Further, as they offer no more than one-tenth the bonding strength of conventional adhesives, and as there are also problems of workability and reliability, they are not practical.

Photocuring adhesives using silicon oligomers having free radical reactivity can be cured by exposure to light, but like RTV rubbers they give poor bonding strength. Even if there are no problems in usage in the temperature range from several degrees Centigrade below zero to 20° C., the bonded materials easily separate from one another at lower temperatures or in the event of a sudden temperature change. They thus had poor reliability, and did not solve the problems inherent in the conventional technology.

It is therefore an object of this invention to resolve these problems inherent in conventional techniques by providing a photocuring adhesive having adequate bonding strength, water resistance and humidity resistance, and which retains all of its adhesive properties even at low temperatures or in the event of a sudden temperature change.

It is a further object of this invention to provide a photocuring adhesive having excellent optical properties and high reliability which can in particular be used for bonding Fine precision optical devices in optronics and other fields.

DISCLOSURE OF INVENTION

This invention is characterized by the addition of a photopolymerization initiator to a monomer composition comprising 20–50 wt % of the oligosiloxanyl di(meth)acrylate represented by the structural formula (1) shown below, 20–60 wt % of a hydrophobic mono(meth)acrylate having a hydrocarbon group containing no less than six carbon atoms in a side chain, and 1–30% of a hydrophilic monomer capable of undergoing free radical polymerization:

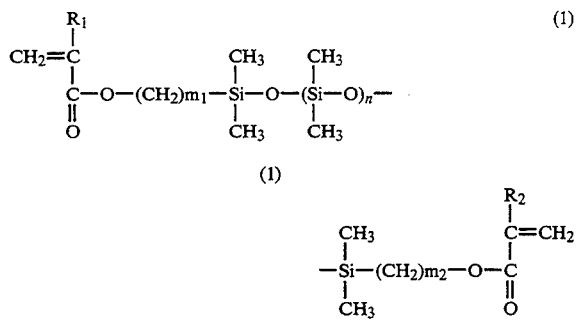

In the formula (1), $R_1$ and $R_2$ are both either hydrogen or methyl, $m_1$ and $m_2$ are integers in the range 2 to 5, and n is an integer in the range 5 to 30.

The ingredients of the composition of this invention, namely a bifunctional oligosiloxane monomer having excellent photocuring properties and low temperature properties, a hydrophilic monomer capable of undergoing free radical polymerization which exhibits excellent adhesive properties, and a hydrophobic mono(meth)acrylate compatible with the two aforesaid ingredients which exhibits excellent photocuring properties, water resistance and humidity resistance, are blended together in a specific ratio such that full advantage is taken of the individual properties of each ingredient, and a photopolymerization initiator is then added to promote photocuring of the composition.

This invention will now be described in more detail.

The oligosiloxanyl di(meth)acrylate represented by formula (1) used in this invention confers excellent water resistance, humidity resistance and good low temperature adhesive properties on the photocuring adhesive. It also plays an important role in alleviating stress due to the difference of thermal expansion coefficients between the substrate and adhesive when there is a sudden change of substrate temperature, and thereby in maintaining the adhesion properties.

To permit it to fulfil this function, the oligosiloxanyl di(meth)acrylate of formula (1) used in this invention must have a limited molecular weight as indicated by $m_1$, $m_2$ and n in the formula, and must also have (meth)acrylate groups at both ends of the oligosiloxanyl skeleton.

In the aforesaid formula, $m_1$, $m_2$ restrict the length of alkyl groups linked to the oligosiloxanyl group. If these alkyl groups are shorter than permitted by the lower limit of the range of this invention, the oligosiloxanyl group easily decomposes and a stable compound cannot be obtained. If on the other hand the alkyl groups are longer than permitted by the upper limit of the range of this invention, it causes a relative decrease of molecular weight of the oligosiloxane. This leads to a decline of bonding strength and low temperature adhesive properties so that the desired adhesive properties of the invention are no longer obtained.

In the aforesaid formula, n specifies the molecular weight of the oligosiloxanyl group. If n is less than the lower limit of the range of this invention, the adhesive bond is fragile and the desired bonding strength is not obtained, while there is also a decrease of water resistance, humidity resistance and low temperature adhesive properties. If on the other hand n is greater than the upper limit of the range of this invention, even the cured adhesive is too flexible and shows sticky property so that a stable bonded structure cannot be obtained. Adhesive properties also decline markedly, and a practically useful bonding strength is not achieved. It is therefore to be preferred that n has a value lying in the range 8 to 20.

The compound having oligosiloxanyl groups of formula (1) used in this invention must be a di(meth)acrylate in order that the adhesive of this invention exhibits good photocuring properties and provides the desired mechanical strength. If an oligosiloxanyl mono(meth)acrylate wherein one end of the oligosiloxanyl group is trimethylsilyl is used, the curing rate markedly decreases when the composition is irradiated by light, the bonding strength severely declines, even the state of the cured adhesive (if curing) is sticky property, and the composition no longer functions properly as an adhesive.

In this invention, the quantity of oligosiloxanyl di(meth)acrylate represented by formula (1) in the adhesive composition is 20 to 50 wt %, but more preferably 25 to 45 wt %. If the quantity of this compound is less the lower limit of the range of this invention, the water resistance and humidity resistance of the adhesive decline, low temperature adhesive properties decline, bonding strength deteriorates, and peeling occurs at low temperature as with conventional adhesives, and the adhesive bond becomes fragile with respect to heat shock so that the advantages of the invention are not attained.

If on the other hand the quantity of the oligosiloxanyl di(meth)acrylate represented by formula (1) is greater than the upper limit of the range of this invention, adhesive properties decline or are lost so that the composition is no longer practically useful as an adhesive.

The oligosiloxanyl di(meth)acrylate of this invention may be used alone, or two or more such compounds may be used together.

Next, the hydrophobic mono(meth)acrylate used in this invention will be described.

The mono(meth)acrylate having a hydrocarbon group containing no less than six carbon atoms in a side chain confers water resistance and humidity resistance on the photocuring adhesive of this invention, and also has the following functions, The hydrophobic mono(meth)acrylate of this invention behaves like a compatibility agent with properties intermediate between the extreme hydrophobicity of the oligosiloxanyl di(meth)acrylate of formula (1), and the extreme hydrophilicity of the hydrophilic monomer capable of free radical polymerization. It prevents separation of the ingredients when the adhesive is blended, and prevents non-uniformity of curing when the adhesive is cured.

The number of carbon atoms in the hydrocarbon group in a side chain of the hydrophobic mono(meth)acrylate used in this invention must be no less than six. If this number is less than six, photocuring properties are poorer, water resistance and humidity resistance decline, and the compound no longer ensures adequate compatibility between the oligosiloxanyl di(meth)acrylate and the hydrophilic monomer. As a result, difficulties arise in using the adhesive.

The hydrophobic mono(meth)acrylate having a hydrocarbon group containing no less than six carbon atoms in a side chain used in this invention may for example be hexyl (meth)acrylate, cyclohexyl (meth)acrylate, octyl (meth)acrylate, 4-t-butylcyclohexyl (meth)acrylate, decyl (meth)acrylate, lauryl (meth)acrylate, pentadecyl (meth)acrylate, phenyl (meth) acrylate, benzyl (meth)acrylate, tricyclo (5, 2, 1, $0^{2,6}$) decyl (meth)acrylate, isobornyl (meth)acrylate or biphenyl (meth)acrylate.

(Meth)acrylates wherein the hydrocarbon group is cyclic such as cyclohexyl (meth)acrylate, isobornyl (meth)acrylate, benzyl (meth)acrylate and tricyclo(5, 2, 1, $0^{2,6}$) decyl (meth)acrylate, are particularly to be preferred as they have excellent photocuring properties, and give an adhesive with excellent bonding strength.

The quantity of hydrophobic mono(meth)acrylate used in this invention is 20 to 60 wt % of the adhesive composition, but more preferably 30 to 50 wt %. If the quantity used is less than the lower limit of the range of this invention, the adhesive does not have sufficient hydrophobic properties or humidity resistance, the compound no longer ensures adequate compatibility between the oligosiloxanyl di(meth)acrylate and the hydrophilic monomer, and a practically useful adhesive is not obtained. If on the other hand, the quantity used is greater than the upper limit of the range of this invention, bonding strength markedly declines so that the composition can no longer be used as an adhesive.

The hydrophobic mono(meth)acrylate of this invention may be used alone, or two or more such compounds may be used together.

Next, the hydrophilic monomer capable of undergoing free radical polymerization used in this invention will be described.

The hydrophilic monomer capable of undergoing free radical polymerization used in this invention is essential for obtaining a strong adhesive bond, and it confers excellent water resistance and humidity resistance on the adhesive by acting conjointly with the oligosiloxanyl di(meth)acrylate and hydrophobic mono(meth)acrylate of the invention.

The hydrophilic monomer capable of undergoing free radical polymerization used in this invention is a compound having a carbon-carbon double bond, and at least a hydroxyl, carboxyl, sulfonyl, phosphonyl, or a substituted or unsubstituted amino group in the molecule.

The hydrophilic monomer capable of undergoing free radical polymerization used in this invention may for example be (meth)acrylic acid or a derivative thereof such as hydroxyethyl (meth)acrylate, hydroxypropyl (meth)acrylate, hydroxybutyl (meth)acrylate, glycerol mono(meth)acrylate, dimethylaminoethyl (meth)acrylate, diethylaminoethyl (meth)acrylate, 2-(meth)acryloyloxyethylsuccinic acid, 2-(meth)acryloyloxyethylphthalic acid, mono(2-(meth)acryloyloxyethyl)acid phosphate, 2-(meth)acryloyloxyethyl-2-hydroxypropylphthalate or 3-chloro-2-hydroxyethylpropyl (meth)acrylate. Other examples are N-vinylpyrrolidone, N-vinylcaprolactam, acrylamide, N-substituted acrylamides and N,N substituted acrylamides.

Of hydrophilic monomer capable of undergoing free radical polymerization, compounds having a carboxyl group such as (meth)acrylic acid, 2-(meth)acryloyloxyethyl phthalic acid and 2-(meth)acryloyloxyethylsuccinic acid, and substituted or unsubstituted acrylamides such as acrylamide and N,N-dimethylacrylamide, are particularly suitable as they confer excellent photocuring properties, remarkably improve the bonding strength of the adhesive, and are also excellent from the viewpoint of water resistance and humidity resistance.

The quantity of hydrophilic monomer capable of undergoing free radical polymerization used in this invention is 1 to 30 wt % of the adhesive composition, but preferably 10 to 25 wt %. If the quantity used is less than the lower limit of the range of this invention, adequate bonding strength is not obtained and the composition is not a practically useful adhesive. If on the other hand the quantity used is greater than the upper limit of the range of this invention, the water resistance and humidity resistance, and the photocuring properties of the adhesive, markedly decline so that the objectives of this invention are not attained, and there are also disadvantages from the viewpoint of optical applications such as clouding of the cured adhesive.

The photopolymerization initiator used in this invention will now be described. This photopolymerization initiator generates free radicals when irradiated with Night in a specific wavelength range.

This initiator may be any of the initiators in common use such as benzoin or a benzoinalkylether derivative, benzophenone or a benzophenone derivative, thioxanthone or a thioxanthone derivative, benzil, acetophenone or an acetophenone derivative, 1-hydroxycyclohexylphenylketone, acylsulfinoxide, 2,4,6-trimethylbenzoyldiphenyl-phosphinoxide, camphorquinone or a camphorquinone derivative, an arylketone derivative, a chloroacridone derivative such as 10-butyl-2-chloroacridone or 1-chloro-3-methylacridone, an azo compound such as azo-bis-iso-butyronitrile, or an organic peroxide such as benzoyl peroxide.

By choosing a photopolymerization initiator with a desired photoabsorption wavelength, these initiators may confer photocuring properties over a wide wavelength range extending from the ultraviolet to the visible region. They may be used alone as when carrying out the normal adjustment of photocuring resins, alternatively two or more may be used together as when for example it is desired to confer on the adhesive superior curing properties which cannot be obtained by the use of one initiator alone by combining a photopolymerization initiator with excellent surface curing properties and a photopolymerization initiator with excellent depth curing properties.

The quantity of photopolymerization initiator used in this invention may be any suitable quantity. It is normally in the range of 0.1 to [0 wt % of the adhesive composition, but more preferably 0. 5 to 5 wt % in order to achieve good photocuring properties.

Of the aforesaid typical compounds used as photopolymerization initiators in the adhesive of this invention, azo compounds such as azo-bis-isobutyronitrile and organic peroxides such as benzoyl peroxide generate free radicals also when heated. Adhesives to which these photopolymerization initiators have been added do not function only as photocuring adhesives, since parts not irradiated by light can be also cured by heating the adhesive substrate. They therefore have the advantage that they can be cured either by making use of their photocuring properties or their heat curing properties.

The photocuring adhesive of this invention, being comprised of the aforesaid constituent ingredients, is characterized in that an adhesive having excellent bonding strength, water resistance, humidity resistance, heat shock resistance and low temperature resistance, can be obtained only by blending these specific ingredients in the proportions disclosed in the invention, and in that the desired adhesive can be obtained only by their mutual interaction.

The adhesive of this invention is homogeneous and transparent, and as the photocured adhesive also has excellent transparency, it is extremely useful in those fields requiring high levels of optical performance such as optronics.

In order to further improve the performance of the adhesive of this invention, small quantities of other desired ingredients may also be added.

These other ingredients may for example be silane coupling agents such as gamma-methacryloxypropyl-trialkoxy-silane or trialkoxyvinylsilane.

These silane coupling agents further improve the water resistance and humidity resistance of the adhesive of this invention, and are preferably added to the adhesive composition in the proportion of 1 to 20 wt % of the adhesive composition. It is particularly to be preferred that the addition proportion is 3 to 10 wt %, in which case the water resistance and humidity resistance of the adhesive of this invention can be further improved without losing any advantages of the adhesive.

Other desired ingredients which may be added are tertiary amines such as triethanolamine or N,N-dimethyl-p-toluidine, these substances being added to further improve photocuring properties. These tertiary amines are preferably added in a proportion of 0.1 to 5 wt % with respect to the adhesive composition. Their addition increases the curing rate of the adhesive, and also helps to reduce interference with the photocuring reaction due to oxygen in the air when the adhesive is cured.

Still other desired ingredients which may be added include hydroquinone to improve the storage life of the adhesive, agents to prevent heat polymerization such as phenothiazine, ultraviolet absorbers to improve the lightfastness of the adhesive, and antioxidants.

BEST MODE FOR CARRYING OUT THE INVENTION (Examples)

The invention will now be described in more detail with reference to the following examples.

EXAMPLE 1

A colorless, transparent photocuring adhesive according to this invention was prepared by mixing together and stirring well the following ingredients in darkness: 35 wt % of an oligosiloxanyl di(meth)acrylate having the following formula (1):

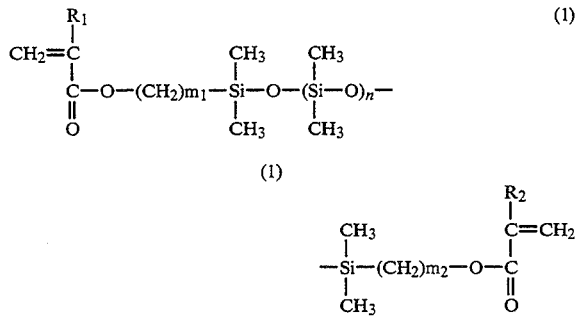

wherein $R_1$, $R_2$ are methyl, $m_1$, $m_2$ are 3 and n is 8, 45 wt % of isobornyl acrylate, 17 wt % of 2-hydroxyethylmethacrylate and 3 wt % of 1-cyclohexylphenylketone.

This adhesive was used for bonding two pieces of pyrex glass with polished edges of which the dimensions were respectively diameter 6 mm, thickness 10 mm and diameter 20 mm, thickness 20 mm.

The bonding operation was performed as follows. One the adhesive prepared as described hereinbefore was placed in the center of the piece of pyrex glass of diameter 20 mm, and the piece of pyrex glass of diameter 6 mm was placed gently over it. The adhesive was then cured with ultraviolet light from a high pressure mercury lamp by irradiating the 6 mm piece of pyrex glass with this light from above for a period of 5 minutes. The irradiation intensity used was 7 mW/cm² at a wavelength of 360 nm.

The two pieces of pyrex glass were found to be firmly bonded together, and there were no air bubbles, cracks or other defects on the bonded surfaces.

In order to measure the bonding strength of the adhesive, a specimen bonded as described hereinbefore was set in a guillotine type compressive shear test apparatus normally used for testing adhesives, and the bonding strength was measured using an Instron Universal Tester.

The bonding strength of the adhesive in this example was 140 Kgf/cm², thus confirming that it has excellent adhesive properties.

In order to evaluate the characteristics of the adhesive in this example at low temperature, five more bonded specimens were prepared according to the aforesaid method, and placed in a cold box kept at a temperature of $-100°$ C. by liquid nitrogen. After leaving for 3 days in the cold box, a bonding strength test was performed as described hereinbefore. The adhesive of this example retained a bonding strength of 120 Kgf/cm² even after storage at $-100°$ C., thus confirming that it has excellent low temperature characteristics.

The characteristics of the adhesive in this example with respect to sudden temperature change were then evaluated by the following method. A bonded specimen prepared according to the method described hereinbefore was heated for 3 hours in a constant temperature bath at 80° C., and then placed immediately in the cold box used for the low temperature test described hereinbefore. After leaving at $-100°$ C. for one hour, it was removed and returned to room temperature. The aforesaid bonding strength test was then performed on the specimen. The adhesive of this example retained a bonding strength of 117 kg/cm², thus confirming that there was practically no change of adhesive properties even after subjecting it to a sudden temperature change.

Next, to evaluate the water resistance of the adhesive in this example, a specimen prepared according to the method described hereintofore was immersed in water at 37° C. for 3 days, and a bonding strength test was performed. The adhesive of this example had a bonding strength of 98 Kgf/cm² or more even after immersion in water, and showed excellent water resistance.

Further, to evaluate the humidity resistance of the adhesive of this example, a specimen prepared according to the method described hereinbefore was stored in a glass desiccator at a high temperature of 80° C. and high relative humidity of 90%.

After 3 days storage, a bonding strength test was performed. The adhesive of this example had a bonding strength of 86 Kgf/cm² or more, thus confirming that it has excellent humidity resistance characteristics.

As described hereinbefore, the adhesive of this example has excellent bonding strength, low temperature resistance, anti-heat shock properties, good water resistance and good humidity resistance.

EXAMPLE 2

An adhesive according to this invention was prepared from the following ingredients: 10 wt % of an oligosiloxanyl di(meth)acrylate having the following formula (1):

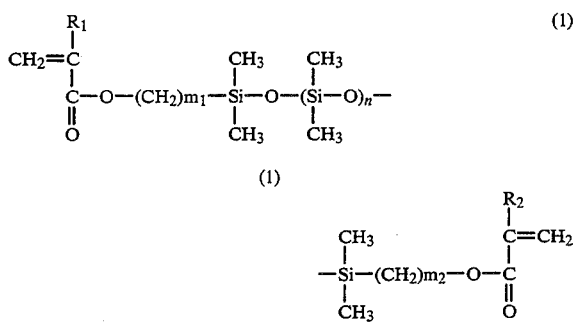

wherein $R_1$, $R_2$ are methyl, $m_1$, $m_2$ are 3 and n is 8, 28 wt % of an oligosiloxanyl di(meth)acrylate having the following formula (1):

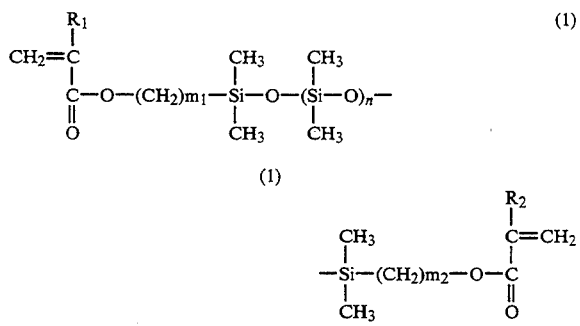

wherein $R_1$, $R_2$ are methyl, $m_1$, $m_2$ are 3 and n is 25, 40 wt % of tricyclo $(5, 2, 1, 0^{2, 6})$decane acrylate, 12 wt % of hydroxyethylmethacrylate, 3 wt % of methacrylic acid, 5 wt % of triethoxyvinylsilane and 2 wt % of 1-cyclohexylphenylketone.

A specimen was prepared as described in Example 1 using this adhesive. The bonding strength of the adhesive in this example was 180 Kgf/cm$^2$, thus confirming that it has excellent adhesive properties.

Using similar specimens, a low temperature test, heat shock test, water resistance test and humidity resistance test were performed according to the method in Example 1. The bonding strength was found to be respectively 174 Kgf/cm$^2$, 160 Kgf/cm$^2$, 135 Kgf/cm$^2$ and 183 Kgf/cm$^2$, thus showing that the adhesive had excellent adhesive properties.

In order to evaluate the adhesive properties of this adhesive with respective to ceramic materials, a pyrex glass piece of diameter 6 mm was bonded to the upper surface of a alumina ceramic piece having the same form as the pyrex glass piece of diameter 20 mm used in Example 1.

The bonding strength of the adhesive was 203 Kgf/cm$^2$. A heat shock test was performed as in the case of the pyrex glass specimen. The bonding strength was then 195 Kgf/cm$^2$, which is approximately the same as when the pyrex glass specimen was used.

EXAMPLES 3-5

Adhesives according to this invention were prepared as in Example 1 using the various oligosiloxanyl di(meth)acrylates, hydrophobic mono(meth)acrylates and hydrophilic monomers capable of undergoing free radical polymerization disclosed hereinbefore. Table 1 shows their compositions, and Table 2 shows their performance characteristics including bonding strength, low temperature bonding strength, bonding strength after sudden temperature change, bonding strength after water immersion and bonding strength at high temperature and high humidity measured as in Example 1.

As shown by the results of in Table 2, the adhesives of Example 3-6 all had excellent bonding strength, low temperature resistance, heat shock resistance, water resistance and humidity resistance as in Example 1.

Comparative Example 1

A composition was prepared by mixing together the same ingredients as in Example 1, excepting that an oligosiloxanyl di(meth)acrylate was used wherein the degree of polymerization(n) of the oligosiloxanyl skeleton in formula (1) was 50 instead of the oligosiloxanyl di(meth)acrylate used in Example 1.

A bonded pyrex glass specimen was prepared by irradiating this composition under the same conditions as those of Example 1. The composition was merely sticky and viscous even after irradiation by ultraviolet light, and the pieces of pyrex glass could easily be separated when held in the hand.

Comparative Example 2

A composition was prepared by mixing together the same ingredients as in Example 1, excepting that an oligosiloxanyl di(meth)acrylate was used wherein the degree of polymerization(n) of the oligosiloxanyl skeleton in formula (1) was 4 instead of the oligosiloxanyl di(meth)acrylate used in Example 1.

A bonded pyrex glass specimen was prepared by irradiating this composition under the same conditions as those of Example 1. A viscous strength of only 20 Kgf/cm$^2$ was obtained. Upon inspection of the broken bonded specimen, the adhesive was found to be powder-like and the photocured adhesive specimen was extremely brittle.

Comparative Example 3

A composition was prepared by mixing together the same ingredients as in Example 1, excepting that the bisphenol A epoxy-modified diacrylate having the formula (2) below, which is commonly used as a photocuring adhesive, was used instead of the oligosiloxanyl di(meth)acrylate used in Example 1:

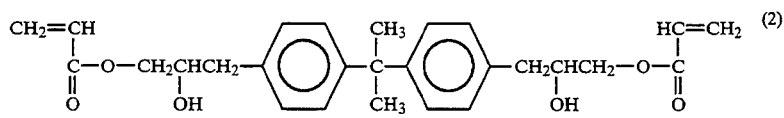

A bonded pyrex glass specimen was prepared by irradiating this composition under the same conditions as those of Example 1. The bonding strength was 75 Kgf/cm$^2$.

A bonding test was performed on a specimen bonded using this composition after immersing the specimen in water at 37° C. for 3 days. The specimen showed a bonding strength of only about 10 or so Kgf/cm$^2$, and it markedly decreased after water immersion.

Comparative Example 4

A composition was prepared by mixing together 70 wt % of the urethane-modified diacrylate shown by the structural formula (3) which is commonly used as a photocuring adhesive, 12 wt % of methyl methacrylate, 15 wt % of hydroxyethylacrylate and 3 wt % of 1-hydroxycyclohexylphenyl-ketone:

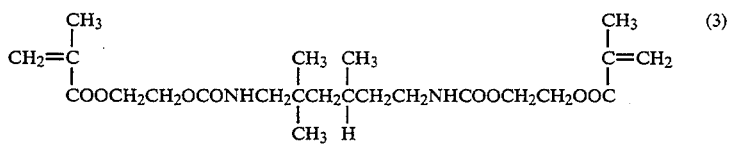

A bonded pyrex glass specimen was prepared by irradiating this composition under the same conditions as those of Example 1. This specimen showed a good bonding strength of 97 Kgf/cm².

Another bonded specimen was heated for 3 hours in a constant temperature bath at 80° C., and then placed immediately in the cold box at −100 ° C. used for low temperature tests as described in Example 1 in order to subject it to a sudden temperature change. A bonding strength test was then performed on the specimen. The bonding strength was found to be 83 kg/cm², thus confirming that the specimen had excellent heat shock resistance.

Next, a bonded specimen prepared as described in this example was immersed in water at 37° C., and another bonded specimen placed in a desiccator at 80° C. and relative humidity 90% as in Example 1. The water resistance and humidity resistance of the adhesive having the composition of this example were then evaluated.

After immersing a bonded specimen prepared from the same composition in water for 3 days, however, the pieces separated spontaneously showing that the specimen had very little useful water resistance. Moreover, a bonded specimen kept at high temperature and high humidity easily broke up when the pyrex glass of diameter 6 mm was held in the hand, thus showing that it effectively had no humidity resistance.

Industrial Applicability

From the aforesaid examples and comparative examples, the adhesive of this invention was shown to have not only good bonding strength, but also excellent low temperature resistance, heat shock resistance, water resistance and humidity resistance. As the adhesive moreover has excellent transparency, it has wide potential application in technological fields such as optronics and precision machining.

These superlative characteristics were not achievable by means of conventional technology. The adhesive of this invention therefore has a unique and outstanding performance.

TABLE 1

ADHESIVE COMPOSITIONS OF EXAMPLES 3-6

| Example No. | Oligosiloxanyl di(meth)acrylate | | | | | Hydrophobic (meth)acrylate | Hydrophilic monomer capable of free radical polymerization | Photopolymerization initiator |
|---|---|---|---|---|---|---|---|---|
| | $R^1$ | $R^2$ | $m^1$ | $m^2$ | n | | | |
| 3 | H | H | 3 (25) | 3 | 20 | TCDA (49) | HEMA/MA (18/5) | CHPP (3) |
| 4 | $CH_3$ | $CH_3$ | 4 (45) | 4 | 12 | TCDM/CHA (10/27) | AA (15) | CHPP (3) |
| 5 | $CH_3$ | $CH_3$ | 3 (35) | 3 | 18 | IBA/TCDA (5/40) | AAm/DMAA (5/14.5) | CHPP (0.5) |
| 6 | H | H | 3 (35) | 3 | 18 | TCDM/TCDA (12/33) | HEA/MA/DM (5/12/1) | C Q (2) |

TABLE 2

BONDING STRENGTH OF ADHESIVES IN EXAMPLES 3-6

| Example No. | Bonding strength (Kgf/cm²) | Bonding strength after storage at −100° C. for 3 days (Kgf/cm²) | Bonding strength after storage at 80° C. for 3 hours, and suddenly cooling to −100° C. (Kgf/cm²) | Bonding strength after immersion in water at 37° C. for 3 days (Kgf/cm²) | Bonding strength after storage at 80° C., 100% RH for 3 days (Kgf/cm²) |
|---|---|---|---|---|---|
| 3 | 124 | 121 | 152 | 85 | 113 |
| 4 | 133 | 107 | 119 | 92 | 99 |
| 5 | 95 | 87 | 110 | 73 | 62 |
| 6 | 117 | 98 | 124 | 68 | 102 |

We claim:

1. A photocuring adhesive wherein a photoinitiator is added to a monomer composition comprising:

(a) 20 to 50 wt % of an oligosiloxanyl di(meth)acrylate represented by the formula (1):

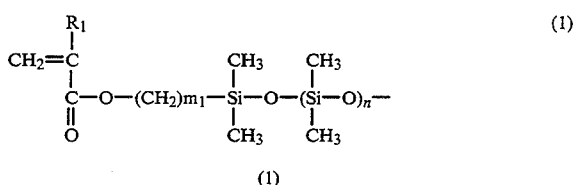

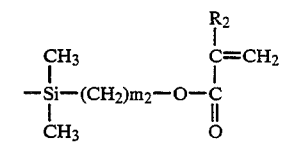

wherein $R_1$ and $R_2$ are independently hydrogen or a methyl group, $m_1$ and $m_2$ are independently integers of from 2 to 5 and n is an integer of from 5 to 30;

(b) 20 to 60 wt % of a hydrophobic mono(meth)acrylate having a hyrocarbon group having at least 6 carbon atoms in a side chain, selected from the group consisting of hexyl (meth)acrylate, cyclohexyl (meth)acrylate, octyl (meth)acrylate, 4-t-butylcyclohexyl (meth)acrylate, decyl (meth)acrylate, lauryl (meth)acrylate, pentadecyl (meth)acrylate, phenyl (meth)acrylate, benzyl (meth)acrylate, tricyclo (5,2,1,0$^{2,6}$) decyl (meth)acrylate, isobornyl (meth)acrylate and biphenyl (meth)acrylate; and (c) 1 to 30 wt % of a hydrophilic monomer capable of undergoing free radical polymerization selected from the group consisting of (meth)acrylic acid, hydroxyethyl (meth)acrylate, hydroxypropyl (meth)acrylate, hydroxybutyl (meth)acrylate, glycerol mono(meth)acrylate, dimethylaminoethyl (meth)acrylate, diethylaminoethyl (meth)acrylate, 2-(meth)acryloyloxyethylsuccinic acid, 2-(meth)acryloyloxyethylphthalic acid, mono[2-(meth)acryloyloxyethyl] acid phosphate, 2-(meth)acryloyloxyethyl-2-hydroxypropyl phthalate, 3-chloro-2-hydroxyethylpropyl (meth)acrylate, N-vinylpyrrolidone, N-vinylcaprolactam, acrylamide, N-substituted acrylamide and N,N-disubstituted acrylamide.

2. A photocuring adhesive as defined in claim 1 characterized in that, in the said formula (1), $m_1$ and $m_2$ are 3 or 4, and n is an integer in the range from 8 to 20.

3. A photocuring adhesive as defined in claim 1 characterized in that it comprises 25 to 45 wt % of said oligosiloxanyl di (meth)acrylate, 30 to 50 wt % of said hydrophobic mono (meth)acrylate, and 10 to 25 wt % of said polymerizing hydrophilic monomer.

* * * * *